June 8, 1926.
B. M. W. HANSON
GAUGE
Filed Feb. 26, 1925
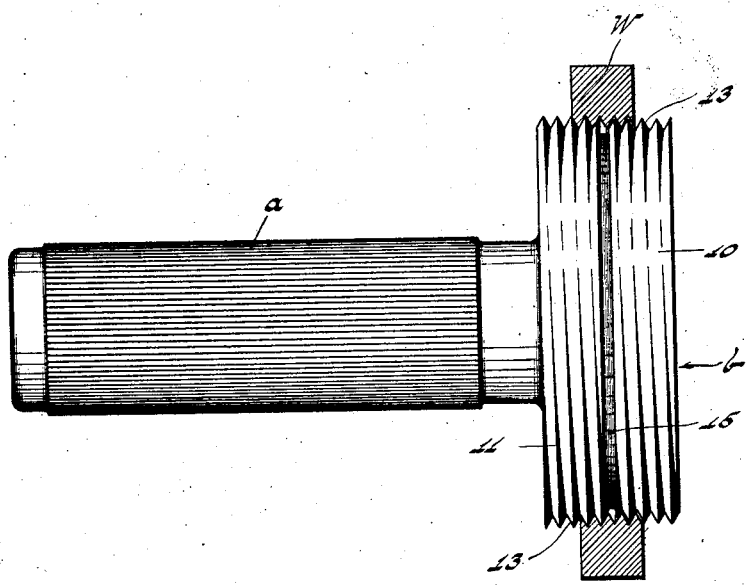
Inventor
Bengt M. W. Hanson
By H. Clay Lindsey
Attorney Patented June 8, 1926.

1,588,363

UNITED STATES PATENT OFFICE.

BENGT M. W. HANSON, OF HARTFORD, CONNECTICUT; EINAR A. HANSON AND CLARENCE E. WHITNEY EXECUTORS OF SAID BENGT M. W. HANSON, DECEASED.

GAUGE.

Application filed February 26, 1925. Serial No. 11,669.

The present invention relates to gauges. In the present illustrative disclosure, the invention is shown as embodied in a plug gauge for measuring internally threaded nuts or rings to which use it is peculiarly applicable, but it is to be understood that the present disclosure is by way of illustration only and the invention is susceptible of other modifications and uses.

Heretofore, gauges of this sort have usually consisted of a handle portion with a gauging portion at each end; or each gauging portion has been mounted on a separate handle. One of these gauging portions may be employed to gauge one factor, limit or dimension of the thread; and the other gauging portion, another factor, limit or dimension. For instance, one of the gauging portions, termed the "go" gauge or portion, may be employed to determine whether or not the pieces to be tested are undersize, and the other, or "no go", gauging portion, and which is of greater diameter than the first one, may be used to determine whether or not the work is oversize. While these old gauges have been successfully used in the metal working art, it is obvious that a great amount of time is wasted in their use, (and particularly where a large number of pieces are to be gauged) because, after a piece of work has been screwed onto the "go" gauging portion, it must be removed therefrom, the gauge turned end for end, and then an attempt must be made to screw the piece of work onto the "no go" or oversize gauging portion. The same objection obtains where the two gauging portions are carried by separate handles and, additionally, the cost of manufacture is materially increased.

It is the object of the present invention to provide an improved gauge wherein the above and other objections and disadvantages, incident to gauges as heretofore constructed, are practically eliminated.

More particularly, the aim of the invention is to provide a gauge by means of which pieces of work may be more expeditiously gauged, and to provide a gauge which is characterized by its simplicity in construction and its economy in cost of manufacture.

Other objects will be in part obvious and in part pointed out more in detail hereinafter.

The invention accordingly consists in the features of construction, combination of elements and arrangement of parts which will be exemplified in the construction hereinafter set forth, and the scope of the application of which will be indicated in the appended claims.

In the accompanying drawing:

The figure is a side elevational view showing one embodiment which the present invention may take.

In said figure, $a$ denotes a handle portion of the gauge, on one end of which is a head or gauging member $b$ having two substantially contiguous gauging portions 10 and 11. Upon the peripheries of these gauging portions is a substantially continuous screw thread 13. The portions of the thread on the two gauging portions are of the same spiral, but one of them differs slightly in at least one dimension from the other. For example, one portion of the thread may be of slightly greater outside diameter than the other portion.

In the present illustrative disclosure, the thread 13 is substantially complementary, throughout its length, to the threads desired on the work or pieces to be gauged, the portions of the thread on the two gauging portions forming parts of the same thread and being substantially identical, except that the part of the thread on the portion 10 is of slightly less diameter than that part of the thread on the portion 11. The relative diameters of the two threaded portions will, of course, vary in accordance with the tolerances permitted in the work. In actual practice, this variation may not exceed one or two thousandths of an inch, the showing in the drawing being exaggerated for illustrative purposes. If desired, the thread may be interrupted between the gauging portions 10 and 11 by a relatively narrow groove 15. This groove may be provided to more clearly distinguish the two gauging portions from one another and in order to facilitate the forming and grinding of the gauging portions. The work to be gauged is shown as having the form of an internally threaded nut W, but it is, of course, obvious that this nut is shown by way of example only.

It will be observed that, with the construction described, the nuts or other pieces of work to be measured may be very quickly gauged, it being necessary to merely screw the nut or other piece to be tested onto the single gauging head $b$. The gauge may be constructed to gauge the inside or outside diameter of the thread on the work, or the lead of the thread, or the angularity of the side faces of the thread. Where the gauge is constructed as shown in the drawing, if the nut is too small to be screwed onto the smaller or "go" threaded portion 10, it will, of course, be rejected as being undersize. If it can be screwed onto the smaller or "go" portion 10 up to but not onto the larger portion 11, the nut is acceptable; that is, it is within the given limits of tolerance. If it is possible to screw the nut onto the larger or "no go" portion 11, as indicated in the figure, the nut is rejected as oversize.

It will be seen that, by employing my improved gauge, since the thread on the two gauging portions is in the form of a continuous spiral, it is possible to determine whether or not the work is oversize while the work is still in engagement with the "go" portion, which would not be the case if the portions of the thread were not continuous of one another. It is not necessary, as heretofore, to unscrew and remove the work from the "go" gauge and then screw it onto the "no go" gauge. Thus, by employing a gauge constructed in accordance with the present invention, the pieces of work may be very quickly and accurately gauged. It will further be observed that my improved gauge is very simple in construction and arrangement and may be manufactured at a relatively low cost; it requires a minimum amount of stock, and the thread on the head $b$ may be economically formed and ground to the correct size and shape.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A gauge of the character described comprising a handle and a gauge head on one end of said handle having two gauging portions of slightly different diameters and provided with a substantially continuous gauging screw thread, said gauging head having between said gauging portions and interrupting said thread a narrow circumferential groove.

2. A gauge of the character described comprising a handle and a cylindrical head having two contiguous gauging portions at one end of said handle, said portions having on their peripheries a gauging thread, the part of the thread on one of said gauging portions being like that part on the other portion but of slightly different diameter, and the parts of the thread on the two portions being complementary to and simultaneously engageable with the thread on the piece of work to be tested.

BENGT M. W. HANSON.